United States Patent
Cho et al.

(10) Patent No.: US 9,572,117 B2
(45) Date of Patent: Feb. 14, 2017

(54) METHOD AND APPARATUS FOR CONTROLLING TRANSMISSION POWER IN WIRELESS COMMUNICATION SYSTEM

(71) Applicant: LG ELECTRONICS INC., Seoul (KR)

(72) Inventors: Heejeong Cho, Seoul (KR); Hyeyoung Choi, Seoul (KR); Sunam Kim, Seoul (KR); Jaehoon Chung, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/900,922

(22) PCT Filed: Jun. 30, 2014

(86) PCT No.: PCT/KR2014/005779
§ 371 (c)(1),
(2) Date: Dec. 22, 2015

(87) PCT Pub. No.: WO2015/005602
PCT Pub. Date: Jan. 15, 2015

(65) Prior Publication Data
US 2016/0309427 A1  Oct. 20, 2016

Related U.S. Application Data

(60) Provisional application No. 61/844,440, filed on Jul. 10, 2013, provisional application No. 61/856,060, filed on Jul. 19, 2013.

(51) Int. Cl.
*H04W 52/14* (2009.01)
*H04W 52/36* (2009.01)
*H04W 52/38* (2009.01)
*H04W 72/04* (2009.01)

(52) U.S. Cl.
CPC ......... *H04W 52/367* (2013.01); *H04W 52/146* (2013.01); *H04W 52/38* (2013.01); *H04W 72/04* (2013.01)

(58) Field of Classification Search
CPC .................... H04W 52/146; H04W 52/365
USPC ................ 455/522, 69, 515, 434, 452.2
See application file for complete search history.

(56) References Cited

U.S. PATENT DOCUMENTS

| 9,179,426 B2 * | 11/2015 | Chen ................ H04B 7/0413 |
| 2011/0256884 A1 * | 10/2011 | Kazmi ............... H04W 48/04 455/456.1 |
| 2012/0020229 A1 | 1/2012 | Dayal et al. |
| 2013/0114562 A1 | 5/2013 | Seo et al. |

(Continued)

FOREIGN PATENT DOCUMENTS

| WO | 2013-025562 A2 | 2/2013 |
| WO | 2013-067430 A1 | 5/2013 |

*Primary Examiner* — John J Lee
(74) *Attorney, Agent, or Firm* — Dentons US LLP

(57) ABSTRACT

A method for and apparatus for controlling transmission power in a wireless communication system is provided. A wireless device checks a duration in which a plurality of radio access technologies (RATs) for uplink resources overlaps, determines whether the transmission power of the UE is greater than a maximum power restriction of the UE in the duration, and controls power of at least one RAT based on priorities of the plurality of RATs so that the transmission power of the UE is under the maximum power restriction of the UE. Thus, dynamic and efficient transmission power is supported.

15 Claims, 15 Drawing Sheets

(56) References Cited

U.S. PATENT DOCUMENTS

2013/0115998 A1* 5/2013 Lamm ................ H04W 52/221
455/522

* cited by examiner

FIG. 4

| Frame control | Persistent /ID | Address 1 | Address 2 | Address 3 | Sequence control | Address 4 | Sequence control | QoS control | HT control | Frame body | FCS |

FIG. 13
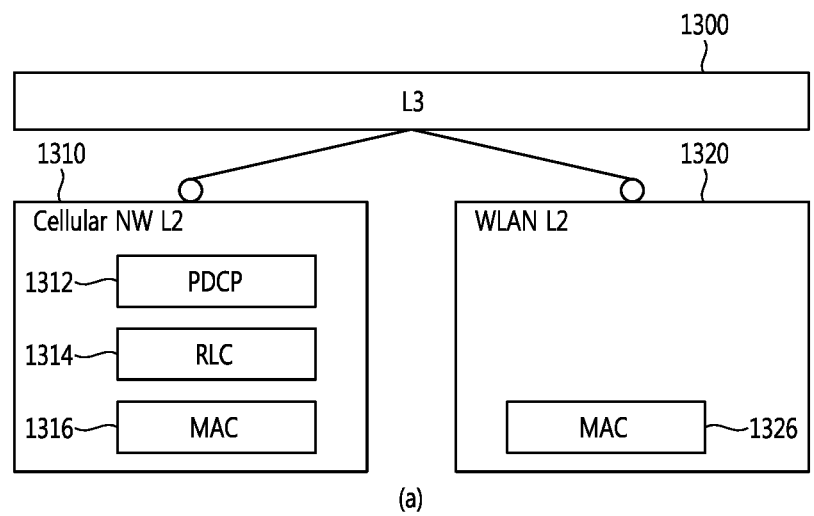
(a)
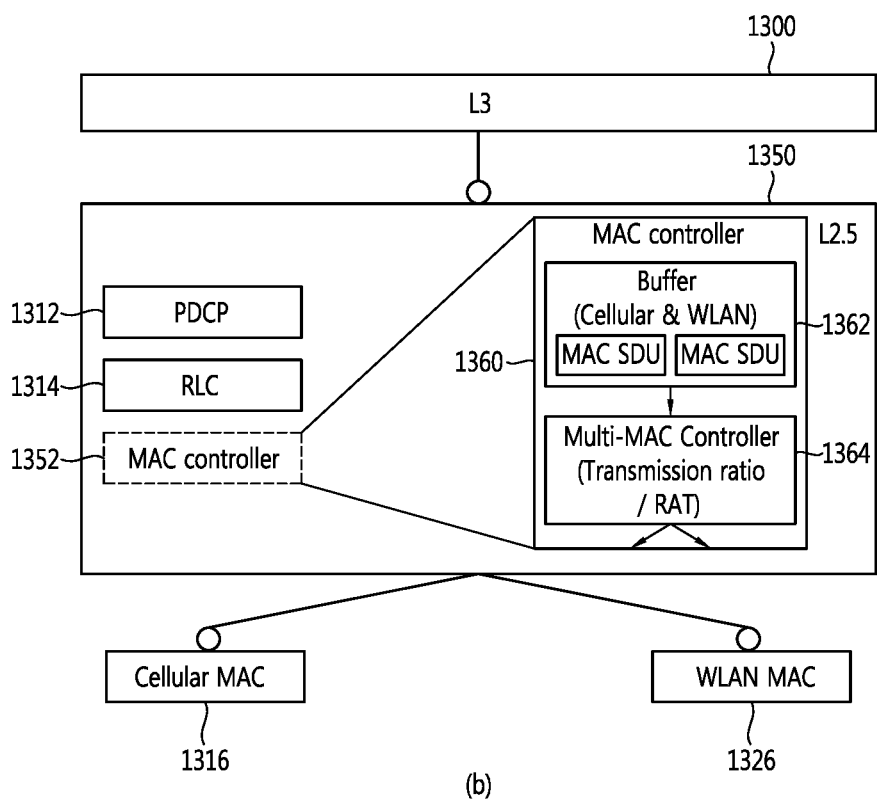
(b)

METHOD AND APPARATUS FOR CONTROLLING TRANSMISSION POWER IN WIRELESS COMMUNICATION SYSTEM

This application is a 35 USC §371 National Stage entry of International Application No. PCT/KR2014/005779 filed on Jun. 30, 2014, and claims priority to U.S. Provisional Application No. 61/844,440 filed on Jul. 10, 2013 and 61/856,060 filed on Jul. 19, 2013, both of which are hereby incorporated by reference in their entireties as if fully set forth herein.

BACKGROUND OF THE INVENTION

Field of the Invention

The present invention relates to wireless communications, and more specifically, to a method and apparatus for controlling transmission power in a wireless communication system having cellular/WLAN integration systems.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a 3rd generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demands for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system.

In general, a 3GPP LTE(-A) or IEEE 802.16 cellular system with relatively broad coverage may be a primary RAT system, and a Wi-Fi system with relatively narrower coverage may be a secondary RAT system.

In general, in an interworking system of the cellular system and the WLAN system, all data flows transmitted/received through a secondary RAT system (e.g., Wi-Fi system) as well as a primary RAT system (e.g., cellular system) may be controlled by a device operating as a local mobility anchor (LMA). In case of simultaneous transmission in the cellular/WLAN integration systems, a scheme of power control may be required.

SUMMARY OF THE INVENTION

The present invention provides a method and apparatus for performing data transmission in a wireless communication system. The present invention also provides a method and apparatus for performing power control in a wireless communication system.

In an aspect, a method for controlling, by a user equipment (UE), transmission power in a wireless communication system is provided. The method includes checking a duration in which a plurality of radio access technologies (RATs) for uplink resources overlaps, determining whether the transmission power of the UE is greater than a maximum power restriction of the UE in the duration, and controlling power of at least one RAT based on priorities of the plurality of RATs so that the transmission power of the UE is under the maximum power restriction of the UE.

In another aspect, a wireless device for controlling transmission power in a wireless communication system is provided. The wireless device includes a radio frequency (RF) unit for transmitting or receiving a radio signal, and a processor coupled to the RF unit, and configured to check a duration in which a plurality of radio access technologies (RATs) for uplink resources overlaps, determine whether the transmission power of the UE is greater than a maximum power restriction of the UE in the duration, and control power of at least one RAT based on priorities of the plurality of RATs so that the transmission power of the UE is under the maximum power restriction of the UE.

The proposed embodiment supports a power control scheme of a simultaneous transmission in interworking system having cellular and Wi-Fi environments. Thus, various user devices each can lead to control transmission power with dynamic ways and efficiency based on each channel condition and scheduling condition.

BRIEF DESCRIPTION OF THE DRAWINGS

FIG. 4 shows an example of a frame structure of WLAN system which the present invention is applied.

FIG. 13 shows a concept of controlling transmission power by a network according to another example of the present invention.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
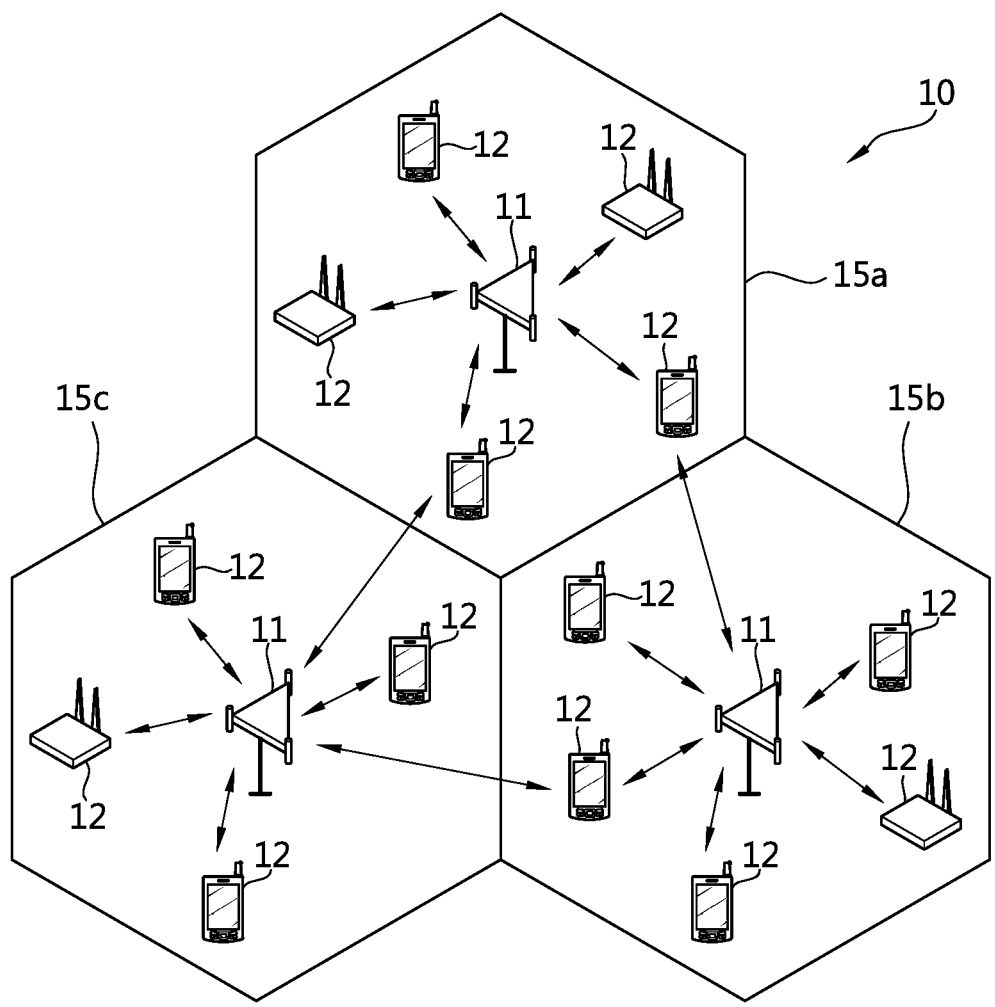
FIG. 1 shows a wireless communication system to which the present invention is applied.

FIG. 1 shows a wireless communication system to which the present invention is applied.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
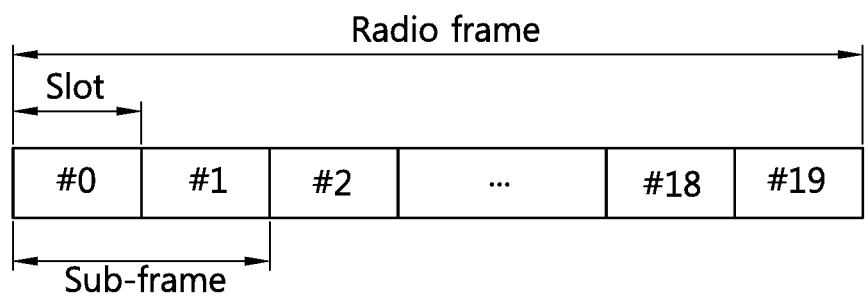
FIG. 2 shows an example of a radio frame structure to which the present invention is applied.

FIG. 2 shows an example of a radio frame structure to which the present invention is applied.

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary. 3GPP LTE defines that one slot includes seven OFDM symbols in a normal cyclic prefix (CP) and one slot includes six OFDM symbols in an extended CP.

Figure 3:
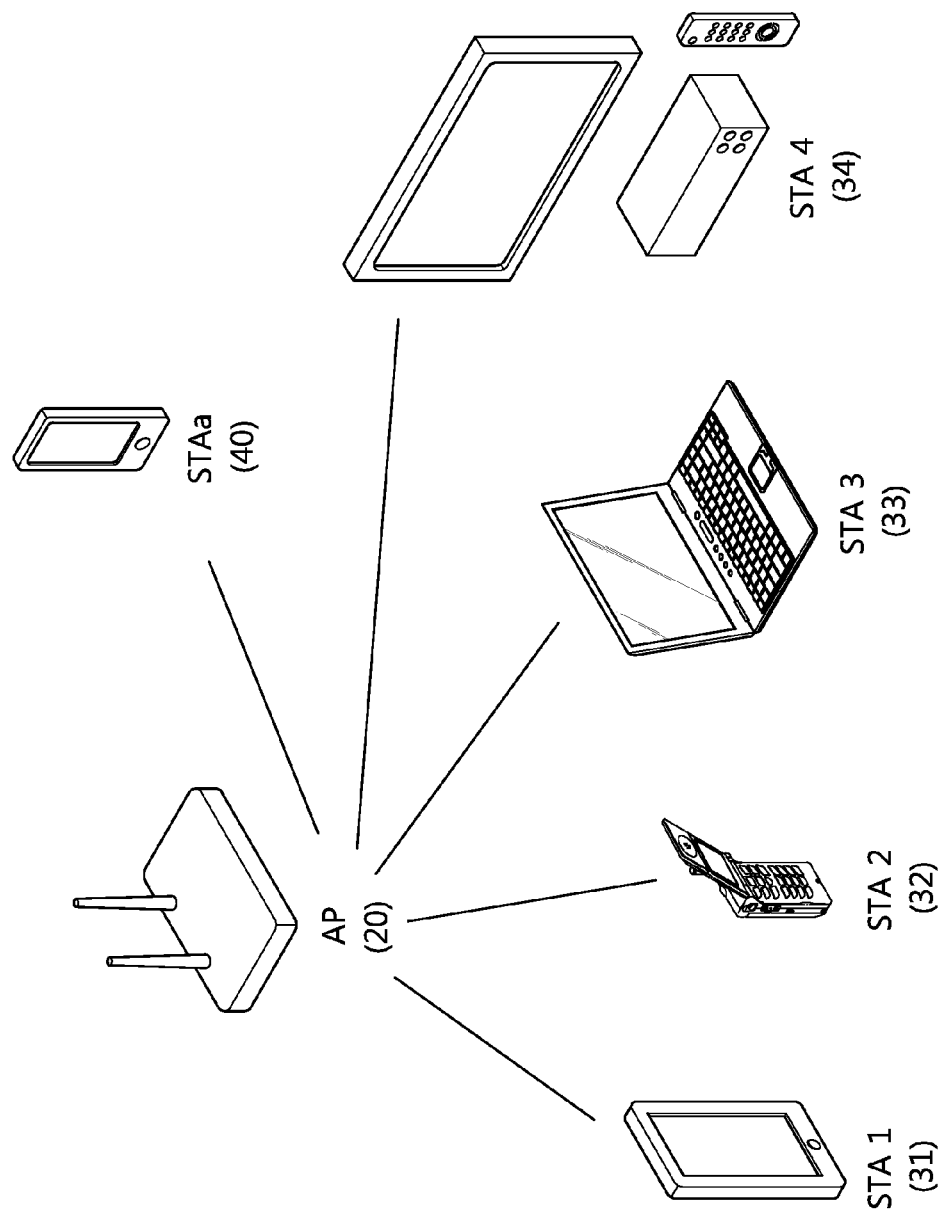
FIG. 3 shows a wireless local area network (WLAN) system which the present invention is applied.

FIG. 3 shows a wireless local area network (WLAN) system which the present invention is applied. The WLAN system may also be referred to as a Wi-Fi system.

Referring to FIG. 3, the WLAN system includes one access point (AP) 20 and a plurality of stations (STAs) 31, 32, 33, 34, and 40). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network. The STA is random functional medium that includes a physical layer interface for a wireless medium and a media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of WLAN system which the present invention is applied. A frame of WLAN system includes a set of fields in a fixed order.

Referring to FIG. 4, the frame includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan a network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation. Three states may exist according to an authentication and association procedure as shown Table 1.

TABLE 1

|  | Authentication | Association |
| --- | --- | --- |
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
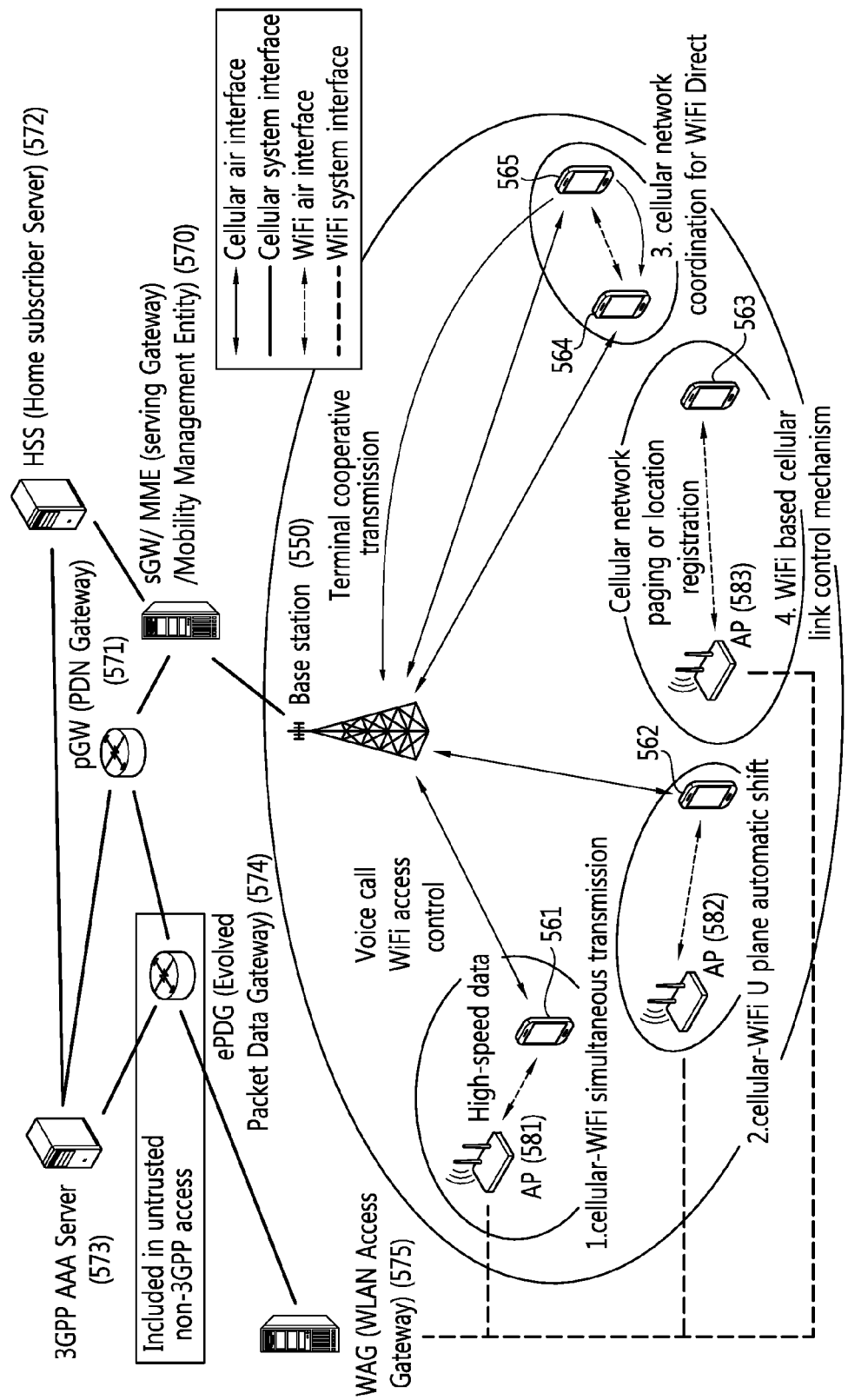
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 561, 562, 563, 564, and 565 in the coverage of the cellular base station 550. Each of the general devices 561, 562, 563, 564, and 565 may be a user equipment in a cellular system. The cellular base station 550 may communicate with each of the general devices 561, 562, 563, 564, and 565 via a cellular radio interface. For example, the cellular base station 550 may perform voice call communication with each of the general devices 561, 562, 563, 564, and 565 or may control access of each general device 561, 562, 563, 564, and 565 to a Wi-Fi system.

The cellular base station 550 is connected to a serving gateway (S-GW)/mobility management entity (MME) 570 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 570 is connected to a packet data network (PDN) gateway (P-GW) 571 and a home subscriber server (HSS) 572 through the cellular system interface. The PDN-GW is a gateway having a PDN as an end point.

The P-GW 571 and the HSS 572 are connected to a 3GPP access authentication authorization (AAA) server 573 through the cellular system interface. The P-GW 571 and the 3GPP AAA server 573 may be connected to an evolved packet data gateway (ePDG) 574 through the cellular system interface. The ePDG 574 may be included only in un-trusted non-3GPP access. The ePDG 574 may be connected to a WLAN access gateway (WAG) 575. The WAG 575 may be in charge of a P-GW in a Wi-Fi system.

Meanwhile, a plurality of APs 581, 582, and 583 may be present in the coverage of the cellular base station 550. Each of the APs 581, 582, and 583 may have coverage which is shorter than that of the cellular base station 550. Each of the APs 581, 582, and 583 may communicate with general devices 561, 562, and 563 that are present in its coverage through a Wi-Fi radio interface. In other words, the general devices 561, 562, and 563 may communicate with the cellular base station 550 and/or APs 581, 582, and 583. Communication methods of the general devices 561, 562, and 563 are as follows:

1) Cellular/Wi-Fi simultaneous radio transmission: the general device 561 may perform high-speed data communication with the AP 581 through a Wi-Fi radio interface while communicating with the cellular base station 550 through a cellular radio interface.

2) Cellular/Wi-Fi user plane automatic shift: the general device 562 may communicate with one of the cellular base station 550 and the AP 582 by user plane automatic shift. At this time, the control plane may be present in both the cellular system and the Wi-Fi system or only in the cellular system.

3) Terminal cooperative transmission: the general device 564 operating as a source device may directly communicate with the cellular base station 550 through a cellular radio interface or may indirectly communicate with the cellular base station 550 through a general device 565 operating as a cooperative device. That is, the cooperative device 565 may assist the source device 564 so that the source device 564 may indirectly communicate with the cellular base station 550 through itself. The source device 564 and the cooperative device 565 communicate with each other through a Wi-Fi radio interface.

4) Wi-Fi-based cellular link control mechanism: the AP 583 may perform a cellular link control mechanism such as paging or location registration of a network for the cellular general device 563. The general device 563 is not directly connected to the cellular base station 550 and may directly communicate with the cellular base station 550 thorough the AP 583.

Each of the APs 581, 582, and 583 is connected to the WAG 575 through a Wi-Fi system interface.

In general, in an interworking system of the cellular system and the WLAN system, all data flows may be transmitted and/or received simultaneously through a plurality of RAT systems (e.g., primary RAT system, secondary RAT system). In addition, all data flows transmitted/received through a secondary RAT system (e.g., Wi-Fi system) as well as a primary RAT system (e.g., cellular system) may be controlled by a device operating as a local mobility anchor (LMA). For example, data to be transmitted through a cellular system and data to be transmitted through a Wi-Fi system always go through the P-GW. That is, in FIG. 5, a device serving as an LMA may be the P-GW. In this regard, a term "LMA" used in a proxy mobile Internet protocol (PMIP) protocol may be called a different term in another protocol, such as home agent (HA).

When data flows are transmitted through the plurality of RAT systems simultaneously in the converged communication system of the cellular system and the Wi-Fi system, scenarios for simultaneous transmission may be classified into a user plane (U-plane) separation for the same data flow (or, bandwidth/U-plane aggregation) and U-plane separation for different data flows (or, bandwidth/U-plane segregation).

Figure 6:
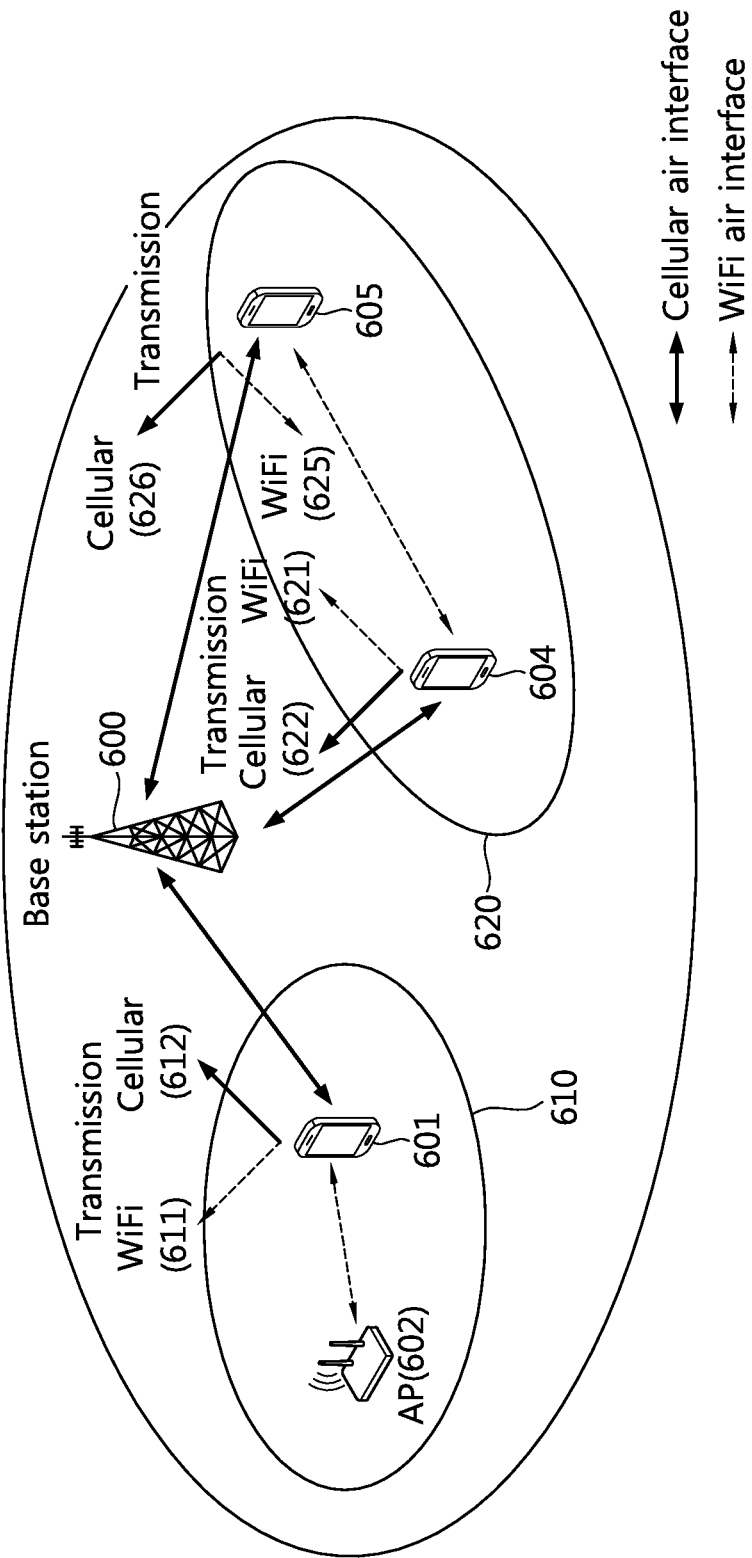
FIG. 6 shows schematically a data flow in a communication environment having multiple RATs to which the present invention is applied.

FIG. 6 shows schematically a data flow in a communication environment having multiple RATs to which the present invention is applied.

Referring to FIG. 6, in a cellular-WiFi convergence system as a next-generation communication system, a data flow may be simultaneously transmitted and received through a plurality of RAT systems (e.g., a primary RAT system and a secondary RAT system). For example, a UE1 601 is connected to an AP 602 to perform Wi-Fi communication and connected to a BS 600 to perform cellular communication. A UE2 604 and a UE3 605 may perform a service in a device-to-device (D2D) communication through Wi-Fi communication, and respectively connected to the BS 600 to perform cellular communication.

In such a case, power consumption of each UE and occurrence of electromagnetic waves may increase due to multi-RAT simultaneous transmission. Also, since the UEs interfere with each other, power consumption and data transmission efficiency may be degraded. Thus, a new power control method considering simultaneously transmission is required.

Hereinafter, in the following description of the present invention, it is assumed that a primary RAT system is a 3GPP LTE system and a secondary RAT system is an IEEE 802.11 (Wi-Fi) system. However, the present invention is not limited to the aforementioned systems and when a new system is introduced, characteristics of the present invention may be partially modified according to a structure of the corresponding system so as to be applied.

Also, the present invention is based on a simultaneous transmission scenario and it is assumed that a data flow session (including signaling and user data) is present in a secondary RAT system as well as in a primary RAT system.

Figure 7:
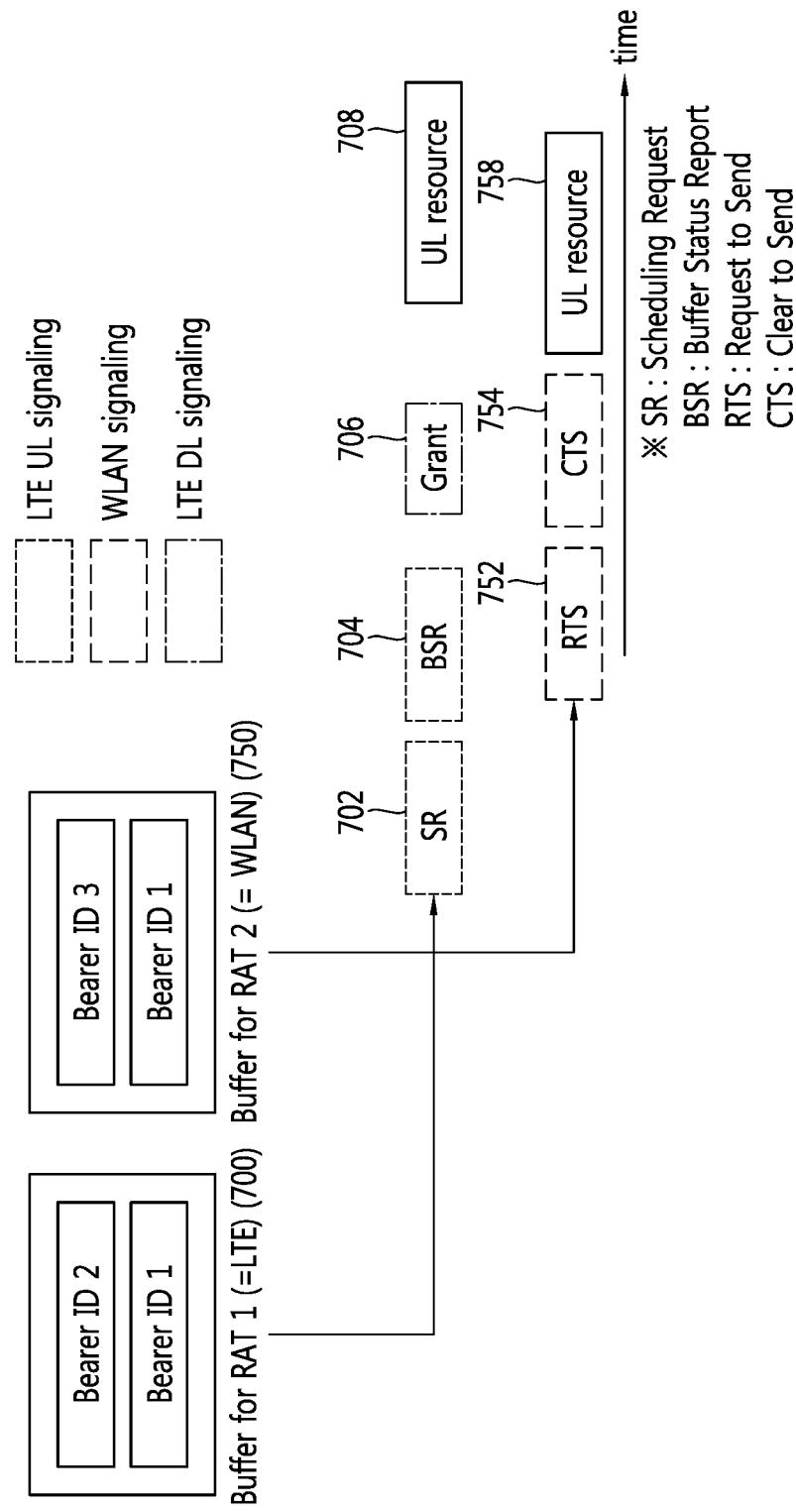
FIG. 7 shows a data flow according to TDD scheme in a wireless communication system to which the present invention is applied.

FIG. 7 shows a data flow according to TDD scheme in a wireless communication system to which the present invention is applied.

Referring to FIG. 7, an LTE system 700 supports bearer ID 1 and bearer ID 2, and a WLAN system 750 supports bearer ID 1 and bearer ID 3. Herein, U-plane aggregation for bearer ID 1 is shown as followings. IP packets for flow ID 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packet 1 in the IP packet for flow 1 is transmitted to the UE through the Wi-Fi system by going through an ePDG and/or a WAG, and IP packets 2 and 3 are transmitted to the UE through the cellular system by going through a BS. In this case, the ePDG or the WAG may be a mobile access gateway (MAG) in the Wi-Fi system, and the BS may be a MAG in the cellular system. In the IP packet for flow 2, the IP packets 5 and 6 are transmitted to the UE through the Wi-Fi system by going through the PDG and/or the WAG, and IP packets 4 and 7 are transmitted to the UE through the cellular system by going through the BS. That is, IP packets for different flows are aggregated each other.

Meanwhile, bearer ID 2 & 3 is applied with U-plane segregation. For example, IP packets for flow 2 include IP packets 21, 22, and 23, and IP packets for flow 22 include IP packets 24, 25, 26, and 27. The P-GW is connected to a PDN 1, and operates as an LMA. That is, all IP packets are transmitted to a UE through the P-GW. The IP packets for flow 2 are transmitted to the UE through the cellular system by going through a BS. In this case, the BS may be an MAG in the cellular system. The IP packets for flow 2 are transmitted to the UE through the Wi-Fi system by going through the ePDG and/or the WAG. In this case, the ePDG or the WAG may be an MAG in the Wi-Fi system. That is, IP packets for different flows are segregated each other.

As shown in FIG. 7, a UE transmits an SR 702 and a BSR 704 to an LTE TDD system and is allocated resource (Grant) 706. Thereafter, the UE transmits data through uplink resource (708). In this case, uplink resource 758 is used through an RTS 752 and a CTS 754 in a WLAN system. Here, LTE UL/DL & WLAN signaling includes every signaling (e.g., random access preamble, random access response, ranging code, ranging request, resource request) related to UL resource allocation.

Hereinafter, a situation in which uplink transmission is performed through a plurality of RATs, while satisfying a maximum power restriction of a general device, is considered. In particular, a power control method in consideration of a maximum power restriction (e.g., 23 dBm) of each general device in a multi-RAT convergence system is described.

A transmission power control method by a general device may be defined as follows.

Method 1: According to instantaneous transmission RAT selection, a general device transmits UL signaling/user data only through a single RAT at a time point.

Method 2: According to dynamic MCS selection and change, a general device may transmit UL signaling/user data through a plurality of RATs at a time point, but transmission power of each RAT is controlled through modulation & coding scheme (MCS) adjustment.

Method 3: According to dynamic power cut, a general device may transmit UL signaling/user data through a plurality of RATs at a time point, and transmission power of each RAT is controlled through power adjustment.

Meanwhile, a method for controlling transmission power by a cellular network may be defined as follows.

Method 1: According to cellular network control based cellular scheduling & power control, a cellular network controls scheduling and power of a cellular system based on buffer status/power headroom information on each RAT transmitted by a general device.

Method 2: According to cellular network control based multi-RAT scheduling & power control, a cellular network controls scheduling and power of each RAT system based on buffer status/power headroom on each RAT transmitted by a general device.

Hereinafter, instantaneous transmission RAT selection is described in detail.

Figure 8:
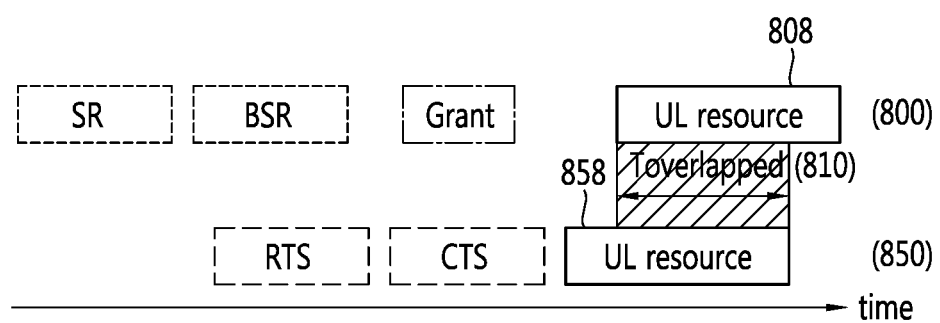
FIG. 8 shows an overlapped duration of transmission power in a wireless communication system to which the present invention is applied.

FIG. 8 shows an overlapped duration of transmission power in a wireless communication system to which the present invention is applied.

Referring to FIG. 8, a UE has been allocated UL resources for uplink transmission by a WLAN system 800 and a WLAN system 850. Here, the UE may define a duration in which available simultaneous uplink transmissions overlap, as $T_{overlapped}$ 810, and in this case, a transmission power control method for guaranteeing data transmission efficiency in consideration of a maximum power restriction may be applied.

Figure 9:
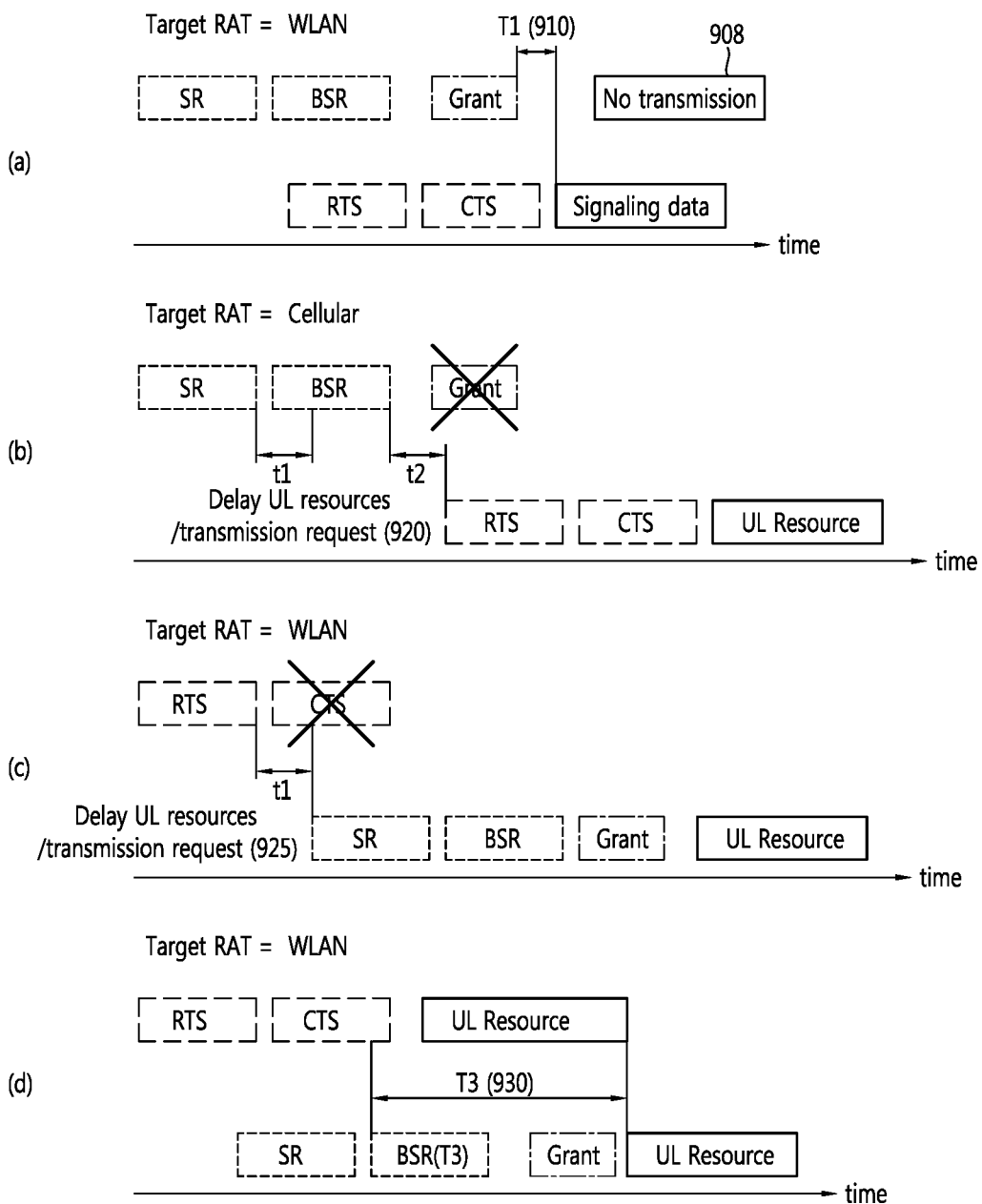
FIG. 9 shows a concept of selecting a target RAT for data transmission according to the present invention.

FIG. 9 shows a concept of selecting a target RAT for data transmission according to the present invention. In FIG. 9, instantaneous transmission RAT selection is shown as a transmission power control method by a UE.

Referring to FIG. 9, whenever transmission/resource durations through a plurality of RATs overlap with each other and transmission power is determined to be insufficient, a general device selects a single RAT (target RAT). A target RAT for a corresponding time point may need to be selected upon determining in units of UE, rather than in units of bearer.

A reference for selecting a target RAT (e.g., a cellular system or a WLAN system) may be defined depending on an RAT that a general device prefers, a RAT indicated by a network, a RAT whose UL resource first starts in a time axis, and characteristics of information desired to be transmitted. Here, the characteristics of information may be defined as e.g., signaling/user data, QoS (urgent/real time/non-real time), routing type (U-plane aggregation/segregation, client cooperation), routing rule (transfer rate/transmission RAT).

For example, in a case in which information to be transmitted through allocated RAT 1 resource is urgent signaling and information to be transmitted through RAT 2 resource is user data, a target RAT may be RAT 1. Also, in a case in which information to be transmitted through allocated RAT 1 resource is non-real time user data and information to be transmitted through RAT 2 resource is real time user data, a target RAT may be RAT 2. Also, in a case in which an RAT indicated by a network is RAT 1, information to be transmitted through allocated RAT 1 resource is non-real time user data employing U-plane segregation, and information to be transmitted through RAT 2 resource is real time user data employing U-plane aggregation, then, the target RAT may be RAT 1 and real time user data may be transmitted.

According to the instantaneous transmission RAT selection method described above, a general device transmits UL signaling/user data through only a target RAT. In this case, the general device does not transmit UL signaling/user data through resource allocated in remaining RATs, excluding the target RAT. Accordingly, waste of resource may occur.

As shown in FIG. 9-(a), when a resource duration in which uplink resources overlap with each other occurs and transmission power is insufficient, the general device determines a target RAT as a WLAN system (900). As for the determination of $T_{overlapped}$, after a grant is received from an LTE system, when data transmission to the WLAN system occurs before data transmission to the LTE system, it may be determined that an overlapped duration is present. In this case, the general device may set the WLAN system to which data transmission occurs first as a target RAT and holds data transmission to the LTE system (908).

Alternatively, in case of requesting UL resource/transmission in consideration of a multi-RAT system, in order to avoid an occurrence of an overlapped duration, the general device does not attempt a UL resource/transmission request for a predetermined period of time (e.g., t1, t2). In a situation that the general device transmits a resource request message (e.g., SR or RTS) to the LTE system or WLAN system, the general device determines whether transmission of a resource request to another RAT is needed or not. In this case, when it is determined that transmission power is insufficient, the general device may selectively determine the target RAT as an LTE system or a WLAN system. In this method, data is transmitted through the selected target RAT preferentially. However, if a situation like FIG. 9-(b) or 9-(c) described below occurs, preference for data transmission is changed to other RAT.

As shown in FIG. 9-(b), the general device determines a target RAT as an LTE system. The general device delays a UL resource/transmission request to the WLAN system by t1 or t2 (920). That is, if resources for transmission of a BSR are not allocated after transmission of an SR by t1 or a grant message is not received after transmission of a BSR by t2, the general device transmits a UL resource/transmission request to the WLAN system.

Also, in FIG. 9-(c), the general device determines a target RAT as a WLAN system and delays a UL resource/transmission request to the LTE system by t1 (925). Thus, if the CTS is not received by t1, the general device transmits an SR and a BSR to the LTE system, is allocated a grant, and subsequently performs uplink transmission.

Alternatively, as shown in FIG. 9-(d), the general device may attempt UL resource/transmission request, and in this case, the general device may use a resource allocation prohibition duration T3. The resource allocation prohibition duration T3 is a duration in which UL resource allocation by any other RAT is prohibited after the target RAT is determined. In this case, the general device may set the T3 value in consideration of a network allocation vector (NAV) value, etc., within the RTS or the CTS.

Referring to FIG. 9-(d), the general device is performing SR transmission to the LTE system, while transmitting RTS/CTS to the WLAN system. In this case, when the general device determines that transmission power is insufficient, the general device determines a target RAT. In this case, when the determined target RAT is the WLAN system which requests UL resource first, the general device informs the base station of the T3 value during BSR transmission to the LTE system. The base station delays resource allocation by a specific time for the corresponding general device to transmit data after the T3 value expires.

Figure 10:
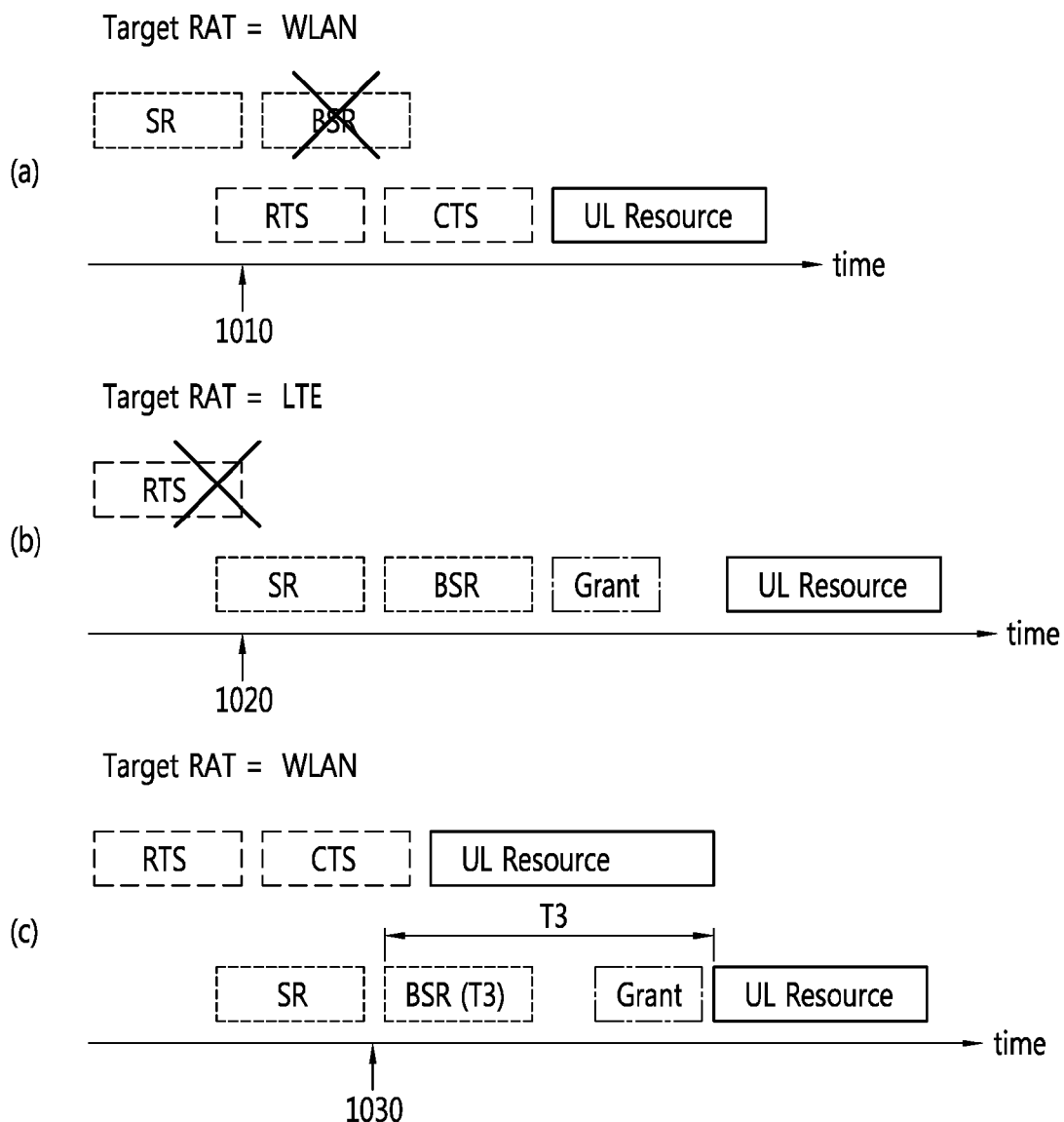
FIG. 10 shows a concept of selecting a target RAT for data transmission according to the present invention.

FIG. 10 shows a concept of selecting a target RAT for data transmission according to the present invention.

Referring to FIG. 10, the general device transmits UL signaling/user data only through a corresponding RAT (target RAT). Here, in order to avoid the occurrence of a non-use resource duration, the general device may stop the UL resource/transmission request procedure in progress through RATs other than the determined target RAT.

In FIG. 10-(a), the general device first accesses to the LTE system and starts to request uplink transmission through an SR. Here, if it is determined that uplink transmission to the WLAN system is required and transmission power is insufficient, the general device determines a target RAT as the WLAN system (1010). And then, the general device stops the UL resource/transmission request procedure (e.g., BSR transmission) in progress to the LTE system, the other RAT. Meanwhile, in FIG. 10-(b), the general device transmits an RTS to the WLAN system to start to request uplink transmission. Here, it is determined that uplink transmission through an SR to the LTE system is required and transmission power is insufficient, the general device determines a target RAT as the LTE system (1020). And then, the general device stops the UL resource/transmission request procedure (e.g., RTS transmission) in progress to the WLAN system.

Or, as shown in FIG. 10-(c), the general device continues the ongoing UL resource/transmission request procedure and informs about the resource allocation prohibition duration T3. When the general device determines that transmission power is insufficient through SR transmission to the LTE system in a situation that the general device transmits an RTS to the WLAN system to request uplink transmission, the general device determines a target RAT. At this time, for example, when the general device determines a target RAT as the WLAN system, the base station delays resource allocation by a specific time for the corresponding general device to transmit data after the T3 value expires.

As described above, when it is determined that transmission power is insufficient, the general device may determine a target RAT in consideration of data characteristics of a corresponding RAT.

Figure 11:
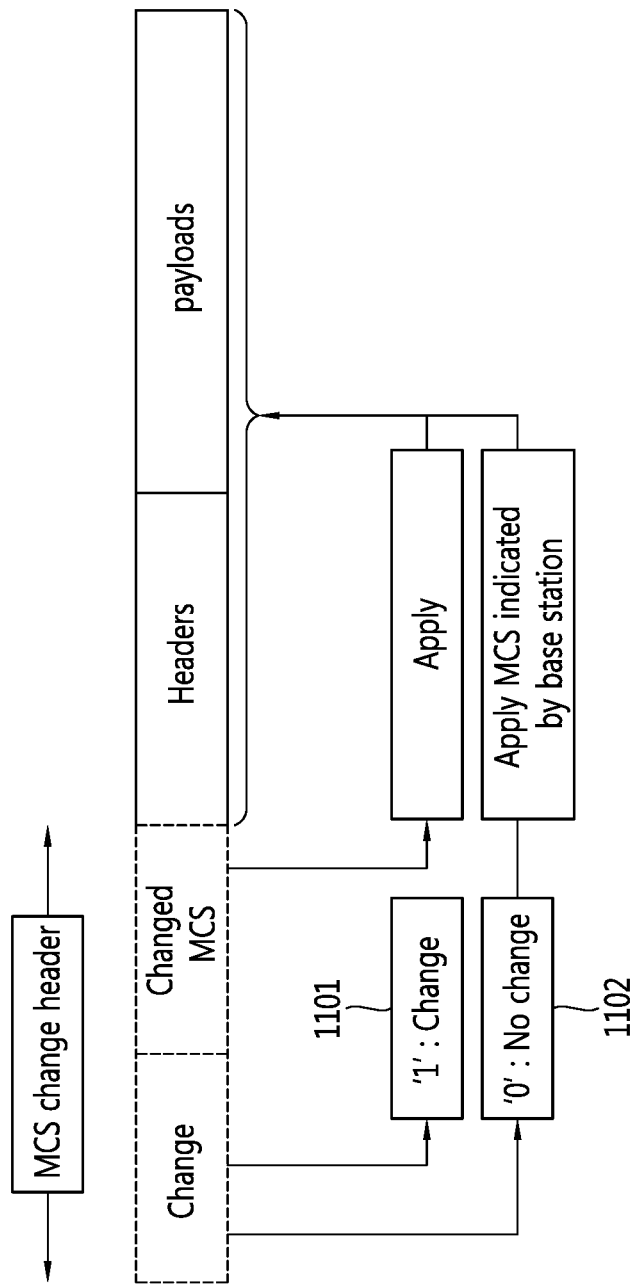
FIG. 11 shows a concept of controlling transmission power using adaptive MCS selection and change according to the present invention.

FIG. 11 shows a concept of controlling transmission power using adaptive modulation & coding scheme (MCS) selection and change according to the present invention.

The general device may transmit UL signaling/user data through a plurality of RATs at a time point, but it may also control transmission power of each RAT by adjusting MCS. In this case, in order to allow the general device to change MCS within a range satisfying a target bit error rate (BER), a cellular network provides a UE-specific reference table.

The UE-specific reference table includes information such as an interference level per transmission power as requested, an MCS range, etc.

Here, the cellular network may determine whether to provide the UE-specific reference table based on a power headroom report transmitted from the general device.

When transmission power shortage possibility is low, the corresponding UE-specific reference table may not need to be provided.

Since each information value may be changed according to a channel state of a corresponding general device, the cellular network may provide the UE-specific reference table when necessary or whenever changed, rather than providing the corresponding UE-specific reference table as a one-off table.

Also, the cellular network may provide a common reference table for the general device in a non-active state such as idle/null, etc. For example, the common reference table may be transmitted using a broadcast channel. The common reference table includes information such as a reception power of the general device, an interference level per transmission power as requested, and an MCS range, etc.

Also, in the WLAN system, the general device adjusts a rate and MCS based on BSSBasicRateSet, OperationalRateSet, MCS-Set, etc. Thus, in order to control transmission power, the cellular network, the WLAN, and the general device may change a corresponding set(s) and may indicate or exchange an updated set(s).

Also, if the general device determines that a maximum power restriction is not satisfied, the general device changes MCS by itself based on a reference table provided from a BS, rather than applying MCS indicated by the BS in resource allocation, e.g., physical downlink control channel, random access response, A-MAP IE, etc. In this case, the general device should inform the BS that MCS has been changed, and provide altered/applied MCS information.

To this end, an MCS change header may be configured as shown in FIG. 11. In this case, the corresponding MCS change header should apply fixed MCS or MCS which has been indicated by the BS. It may be configured in the form of separate encoding.

In a case in which the MCS change header indicates change (1) (1101), the general device controls power by applying the changed MCS. Or, in a case in which the MCS change header indicates "no change" (0) (1102), data is transmitted with an MCS level previously indicated by the BS and power therefor is used.

Figure 12:
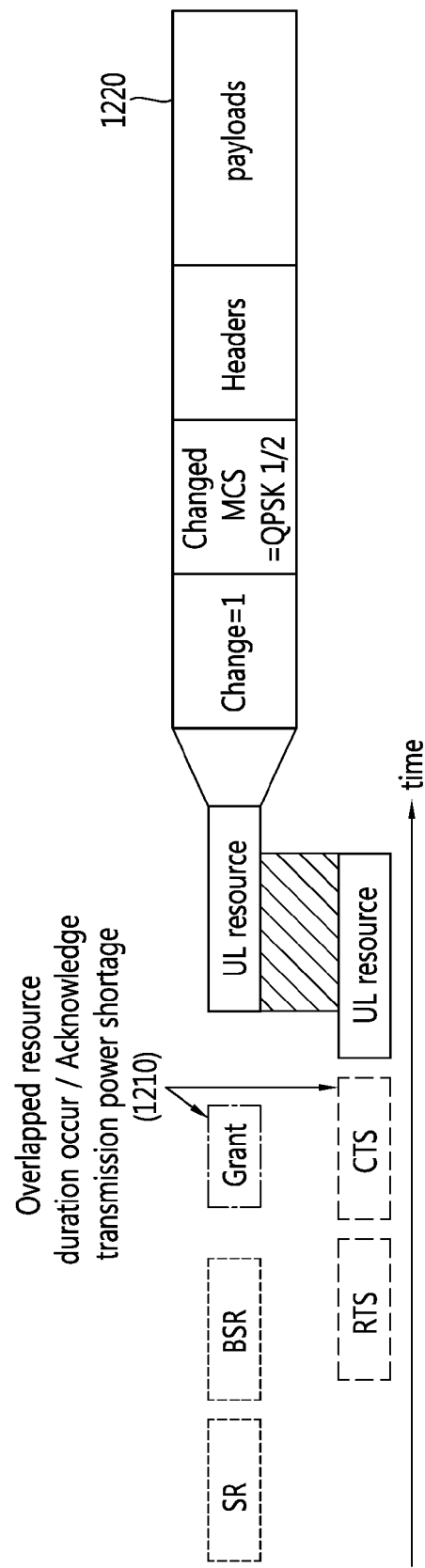
FIG. 12 shows a concept of controlling transmission power using adaptive MCS selection and change according to the present invention.

FIG. 12 shows a concept of controlling transmission power using adaptive MCS selection and change according to the present invention. FIG. 12 describes an extended concept of FIG. 11.

For example, in a case in which an MCS change header is defined as a physical layer header, a physical layer decodes a corresponding header and subsequently determines how a following PDU has been encoded according to a change field value.

In another example, in a case in which an MCS change header is defined as an upper layer (e.g., MAC) header, a physical layer of the general device decodes a region of a corresponding header and subsequently delivers the decoding result to an upper layer. The upper layer determines how a following PDU has been encoded according to a change field value. The upper layer informs the physical layer about the determination results, e.g., whether MCS has been changed and changed MCS.

For example, in a state in which the general device has been allocated grant after transmitting an SR and a BSR to the LTE system, the general device transmits RTS/CTS to the WLAN system so as to be in a state of being available for uplink transmission. At this time, when the general device determines that a duration in which uplink transmissions overlap with each other and transmission power is insufficient, the general device changes MCS based on a reference table provided by the BS, and should subsequently provide information indicating that the MCS has been changed and changed/applied MCS information to the BS. Thus, the general device performs uplink transmission by applying the changed MCS.

Hereinafter, a method of performing dynamic power cutting by the general device is described. As shown in FIG. 11, the cellular network provides a UE-specific reference table to allow the general device to change transmission power within a range satisfying a target BER. The UE-specific reference table includes information such as an interference level per target BER, a transmission power range, etc. In this case, the cellular network may determine whether to provide the UE-specific reference table based on a power headroom report transmitted from the general device.

Also, since each information value may be changed according to a channel state of the general device, the reference table may be provided when necessary. Also, the reference table may be provided in the form of a common reference table, and the common reference table includes information such as a reception power of the general device, an interference level per target BER, and a transmission power range, etc.

Thus, in a case in which the general device determines that maximum power restriction is not satisfied, the general device changes transmission power by itself based on the reference table. Namely, the general device dynamically performs power cutting in consideration of a channel state and a power state thereof.

FIG. 13 shows a concept of controlling transmission power by a network according to another example of the present invention.

Referring to FIG. 13, it is assumed that a cellular network controls transmission power in consideration of cellular scheduling & power control.

In this case, the cellular network may obtain scheduling and power control-related information of each RAT. The cellular network determines information for controlling power of each candidate RAT by using cellular air/network link, primitive presented between the AP and eNB, or by using cellular air link presented between the general device and eNB.

Also, the general device may transmit buffer status/power headroom to the cellular network to allow the cellular network to reasonably perform power controlling. For example, in a case in which it is determined that new/pending data exists with respect to two or more RATs and there is a high possibility that a maximum power restriction is not satisfied, for example, in case of available transmission power≤threshold configured or defined by network, corresponding information is reported to allow a UE to minimize overhead according to report.

FIG. 13-(a) shows a case in which data buffer exists for each RAT. Here, an L2 layer of a cellular system includes a PDCP 1312, an RLC 1314, and a MAC 1316, and an L2 layer of a WLAN system includes a MAC 1326. Thus, the cellular network determines scheduling and power in the cellular system based on the obtained scheduling and power control information of the WLAN system and the buffer status/power headroom of each RAT. In this case, the cellular network allocates resources such that there is no duration in which the resources overlap with resources allocated by the WLAN system, or optimizes MCS/transmission power such that transmission power is not insufficient.

Thereafter, the cellular network provides the determined scheduling and power information to the general device. The general device transmits uplink data by applying the scheduling and power received from the cellular network.

FIG. 13-(b) shows a case in which data of each RAT is commonly managed. Here, an L2 layer of the cellular system includes a PDCP 1312, an RLC 1314, and a MAC 1316, an L2 layer of the WLAN system includes 1326, and these two systems commonly include a MAC controller 1352. The cellular network determines scheduling and power in the cellular system based on the obtained scheduling and power control information of the WLAN system and the buffer status/power headroom of each RAT. In this case, the cellular network allocates resources such that there is no duration in which the resources overlap with resources allocated by the WLAN system, or optimizes MCS/transmission power such that transmission power is not insufficient.

Also, the cellular network may instruct to temporarily transmit a particular bearer (e.g., a bearer whose routing type is U-plane aggregation) only to one RAT (e.g., cellular, WLAN). Thus, the cellular network may deliver a temporary transmission RAT application duration together, and also, the corresponding instruction may be terminated by a release message from the cellular network.

The cellular network provides the determined scheduling, and temporary transmission RAT-related information to the general device. The general device applies the scheduling, power, and temporary transmission RAT received from the cellular network.

In addition, the cellular network may control transmission power in consideration of multi-RAT scheduling & power control.

The cellular network controls and determines scheduling, power, etc., in the WLAN as well as in the cellular system based on the obtained scheduling and power control information of the WLAN system and buffer status/power headroom. In this case, the cellular network may allocate resources with respect to each RAT such that the resources do not overlap with each other or determines an allocation prohibition duration, and optimizes MCS/transmission power such that power shortage does not occur.

Also, the cellular network may instruct to temporarily transmit a particular bearer (e.g., a bearer whose routing type is U-plane aggregation) only to one RAT (e.g., cellular, WLAN). This falls to the common buffer case as shown in FIG. 13-(b). Thus, the cellular network may deliver a temporary transmission RAT application duration together, and also, the corresponding instruction may be terminated by a release message from the cellular network. The cellular network provides information related to the determined scheduling, power, and temporary transmission RAT (only the general device) to the genera device and an AP.

The general device and the AP apply the scheduling, power, and temporary transmission RAT (only the general device) received from the cellular network. Also, when scheduling information related to allocation prohibition duration, etc., is received from the cellular network, the AP allocates resources by avoiding the corresponding duration.

Figure 14:
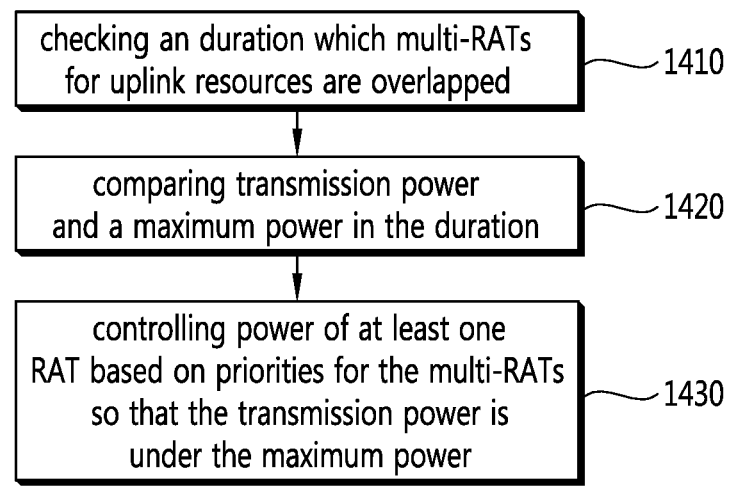
FIG. 14 is a flow chart of power control to which the present invention is applied.

FIG. 14 is a flow chart of power control to which the present invention is applied.

Referring FIG. 14, the UE checks a duration in which a plurality of RATs for uplink resources overlaps, determines whether the transmission power of the UE is greater than a maximum power restriction of the UE in the duration, and controls power of at least one RAT based on priorities of the plurality of RATs so that the transmission power of the UE is under the maximum power restriction of the UE. The controlling power of at least one RAT may include selecting a target RAT of which uplink resource is available to transmit. The controlling power of at least one RAT may include controlling uplink resources of other RATs except the target RAT are not available to transmit. The controlling uplink resources of other RATs may include controlling the uplink resources of other RATs except the target RAT are delayed in a delayed duration. The controlling uplink resources of other RATs may include controlling the uplink resources of other RATs except the target RAT are restricted to request from the UE in a restriction duration. The durations are set by the channel state or type of data.

Also, the selecting the target RAT may include setting the target RAT per UE. The target RAT may be determined by an RAT which the UE prefers, an RAT which a network indicates to the UE, a first RAT which an uplink resource of the first RAT is granted earlier than a second RAT, a type of information which a RAT transmits, and the type of information may include a data type of signaling and user data, a QoS type including urgent, real time, non-real time, a routing type including U-plane aggregation, segregation, client cooperation, and a routing rule including a transmission ratio and transmission RATs.

Also, the controlling power of at least one RAT may include controlling a MCS level within a target BER.

The UE may receive a UE specific reference table including an interference level and a MCS range from a network of a primary RAT system, change a MCS based on the UE specific reference table from the MCS level, and transmit an uplink data with the changed MCS. The UE specific reference table may be determined by a power headroom report transmitted from the UE. The UE may generate a signal including a MCS change header which indicates whether the MCS is changed or not with a bit, and transmit the signal to the network.

The UE may transmit a buffer status report and a power headroom report to a primary RAT system, and receive a scheduling and power control based on information including the buffer status report and the power headroom report and information including buffer status reports and power headroom reports from secondary RAT systems, from a network of the primary RAT system. The UE may receive a RAT information indicating whether a RAT among the primary RAT and the secondary RATs is available to transmit based on bearer information.

Figure 15:
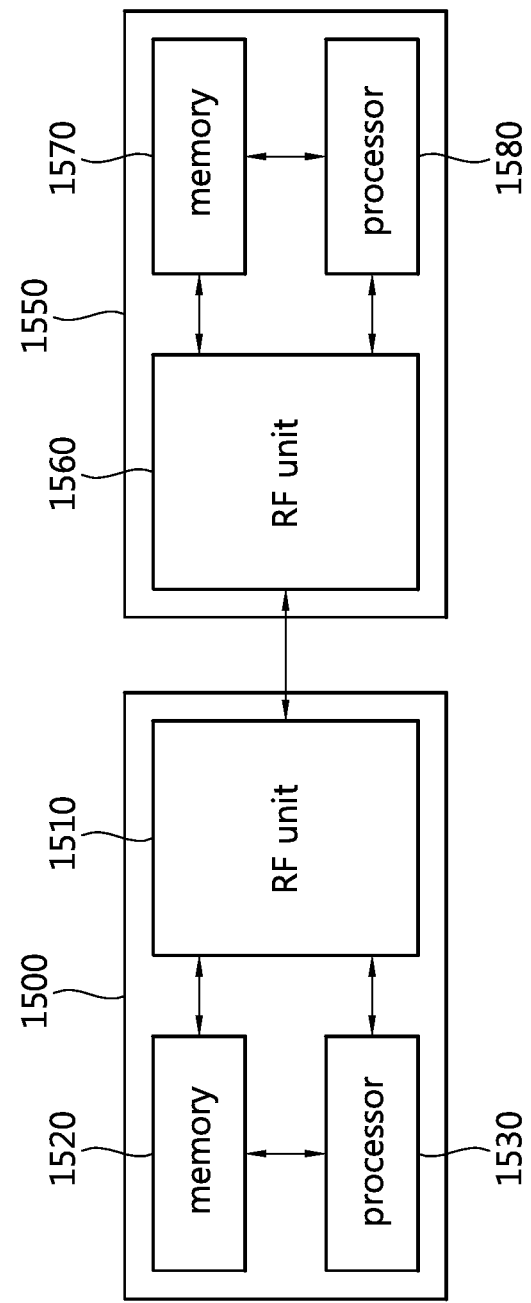
FIG. 15 is a block diagram showing a wireless communication system according to an embodiment of the present invention.

FIG. 15 is a block diagram showing a wireless communication system according to an embodiment of the present invention.

A BS 1550 includes a processor 1551, a memory 1552, and a radio frequency (RF) unit 1553. The memory 1552 is coupled to the processor 1551, and stores a variety of information for driving the processor 1551. The RF unit 1553 is coupled to the processor 1551, and transmits and/or receives a radio signal. The processor 1551 implements the proposed functions, procedures, and/or methods. In the embodiments of FIG. 2 to FIG. 14, the operation of the BS can be implemented by the processor 1551.

Especially, the processor 1551 may configure a scheduling and power control, a RAT information indicating whether a RAT among the primary RAT and the secondary RATs is available to transmit based on bearer information, it is for one or more cells with different frequencies or systems including cellular/Wi-Fi, for this invention the processor 1551 may configure a UE specific reference table or common reference table to control scheduling and power for each UE, wherein the UE specific reference table each is determined by a power headroom report transmitted from UEs each.

The processor 1551 may configure information including a delayed duration that the uplink resources of other RATs except the target RAT are delayed, a restriction duration that the uplink resources of other RATs except the target RAT are restricted to request from the UE. It also configures a MCS level within a target BER for the UE.

The durations each is changeable and varied by at least one of a network preference including a primary RAT system or the secondary RAT system, a QoS information, and bearer information, and condition of UEs each.

The wireless device 1560 includes a processor 1561, a memory 1562, and an RF unit 1563. The memory 1562 is coupled to the processor 1561, and stores a variety of information for driving the processor 1561. The RF unit 1563 is coupled to the processor 1561, and transmits and/or receives a radio signal. The processor 1561 implements the proposed functions, procedures, and/or methods. In the embodiments of the FIG. 2 to FIG. 14, the operation of the UE can be implemented by the processor 1561.

Especially, the processor 1561 may configure one or more cells with different frequencies or systems including cellular/Wi-Fi, for this invention the processor 1551 may configure U-plane configuration having a WLAN triggering condition, a measurement configuration, and/or radio bearer configuration with the Wi-Fi system as the secondary system.

Further, the processor 1561 may check and determine a duration which a plurality of RATs for uplink resources are overlapped, whether the transmission power of the UE is greater than a maximum power restriction of the UE in the duration. And it may control power of at least one RAT based on priorities of the plurality of RATs so that the transmission power is under the maximum power restriction. Also the processor 1561 may check and configure a scheduling and power control, a RAT information indicating whether a RAT among the primary RAT and the secondary RATs is available to transmit based on bearer information, it is for one or more cells with different frequencies or systems including cellular/Wi-Fi, for this invention the processor 1561 may configure a UE specific reference table or common reference table to control scheduling and power for each UE, wherein the UE specific reference table each is determined by a power headroom report transmitted from UE. And the common reference table is determined by a state of UE which are active/idle by receiving and checking a broadcast channel.

The processor 1561 may configure information including a delayed duration that the uplink resources of other RATs except the target RAT are delayed, a restriction duration that the uplink resources of other RATs except the target RAT are restricted to request from the UE. It also configures a MCS level within a target BER for the UE. The durations each is changeable and varied by at least one of a network preference including a primary RAT system or the secondary RAT system, a QoS information, and bearer information, and condition of UEs each.

The processor 1561 may determine to change a MCS based on the UE specific reference table from the MCS level, and transmit an uplink data with the changed MCS.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for controlling, by a user equipment (UE), transmission power in a wireless communication system, the method comprising:
checking a duration in which a plurality of radio access technologies (RATs) for uplink resources overlaps;
determining whether the transmission power of the UE is greater than a maximum power restriction of the UE in the duration; and
controlling power of at least one RAT based on priorities of the plurality of RATs so that the transmission power of the UE is under the maximum power restriction of the UE.

2. The method of claim 1, wherein the controlling power of at least one RAT comprises:
selecting a target RAT of which uplink resource is available to transmit.

3. The method of claim 2, wherein the selecting the target RAT comprises:
setting the target RAT per UE,
wherein the target RAT is determined by an RAT which the UE prefers, an RAT which a network indicates to the UE, a first RAT which an uplink resource of the first RAT is granted earlier than a second RAT, a type of information which a RAT transmits, and
wherein the type of information includes a data type of signaling and user data, a quality of service (QoS) type including urgent, real time, non-real time, a routing type including user plane (U-plane) aggregation, segregation, client cooperation, and a routing rule including a transmission ratio and transmission RATs.

4. The method of claim 2, wherein the controlling power of at least one RAT comprises:
controlling uplink resources of other RATs except the target RAT are not available to transmit.

5. The method of claim 4, wherein the controlling uplink resources of other RATs comprises:
controlling the uplink resources of other RATs except the target RAT are delayed in a delayed duration.

6. The method of claim 4, wherein the controlling uplink resources of other RATs comprises:
controlling the uplink resources of other RATs except the target RAT are restricted to request from the UE in a restriction duration.

7. The method of claim 2, wherein the controlling power of at least one RAT comprises:
controlling a modulation and coding scheme (MCS) level within a target bit error rate (BER).

8. The method of claim 7, further comprising:
receiving a UE specific reference table including an interference level and a MCS range from a network of a primary RAT system;

changing a MCS based on the UE specific reference table from the MCS level; and transmitting an uplink data with the changed MCS.

9. The method of claim 8, wherein the UE specific reference table is determined by a power headroom report transmitted from the UE.

10. The method of claim 8, further comprising:

generating a signal including a MCS change header which indicates whether the MCS is changed or not with a bit; and transmitting the signal to the network.

11. The method of claim 1, further comprising:

transmitting a buffer status report and a power headroom report to a primary RAT system; and receiving a scheduling and power control based on information including the buffer status report and the power headroom report and information including buffer status reports and power headroom reports from secondary RAT systems, from a network of the primary RAT system.

12. The method of claim 11, wherein the scheduling and power control further includes a RAT information indicating whether a RAT among the primary RAT and the secondary RATs is available to transmit based on bearer information.

13. The method of claim 11, wherein the primary RAT system is a 3rd generation partnership project (3GPP) long-term evolution (LTE) system, and wherein the secondary RAT system is an institute of electrical and electronics engineers (IEEE) 802.11 system for the plurality of RATs.

14. A wireless device for controlling transmission power in a wireless communication system, the wireless device comprises:

a radio frequency (RF) unit for transmitting or receiving a radio signal; and a processor coupled to the RF unit, wherein the processor:

checks a duration in which a plurality of radio access technologies (RATs) for uplink resources overlaps;

determines whether the transmission power of the UE is greater than a maximum power restriction of the UE in the duration; and controls power of at least one RAT based on priorities of the plurality of RATs so that the transmission power of the UE is under the maximum power restriction of the UE.

15. The wireless device of claim 14, wherein the processor controls the RF unit to transmit a buffer status report and a power headroom report to a primary RAT system; and receive a scheduling and power control based on information including the buffer status report and the power headroom report and information including buffer status reports and power headroom reports from secondary RAT systems, from a network of the primary RAT system.

* * * * *